May 9, 1939.  T. E. BROWN  2,157,398
BELT SHIFTING MECHANISM FOR A LATHE
Filed Nov. 15, 1937  2 Sheets-Sheet 1
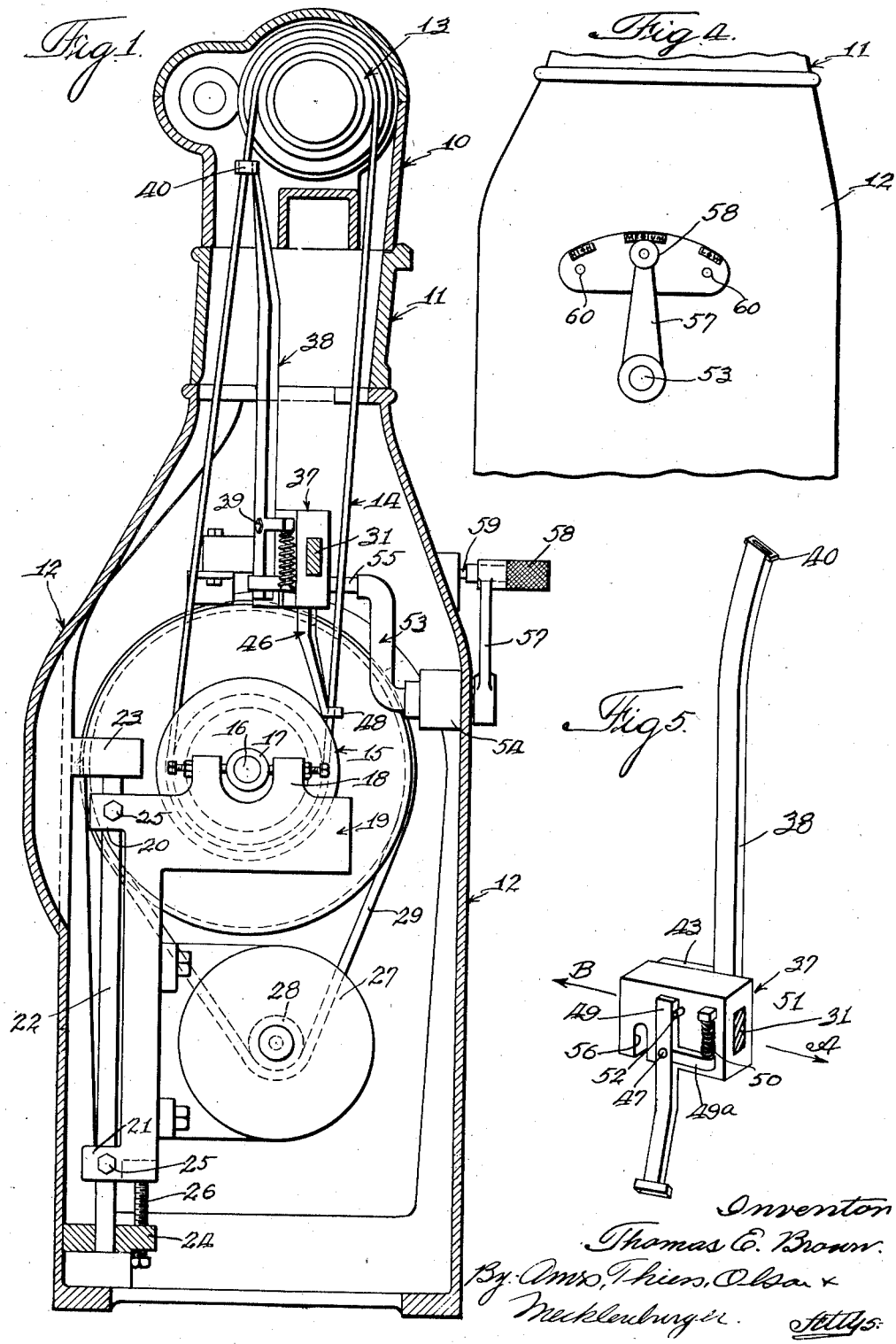

May 9, 1939.  T. E. BROWN  2,157,398
BELT SHIFTING MECHANISM FOR A LATHE
Filed Nov. 15, 1937  2 Sheets-Sheet 2
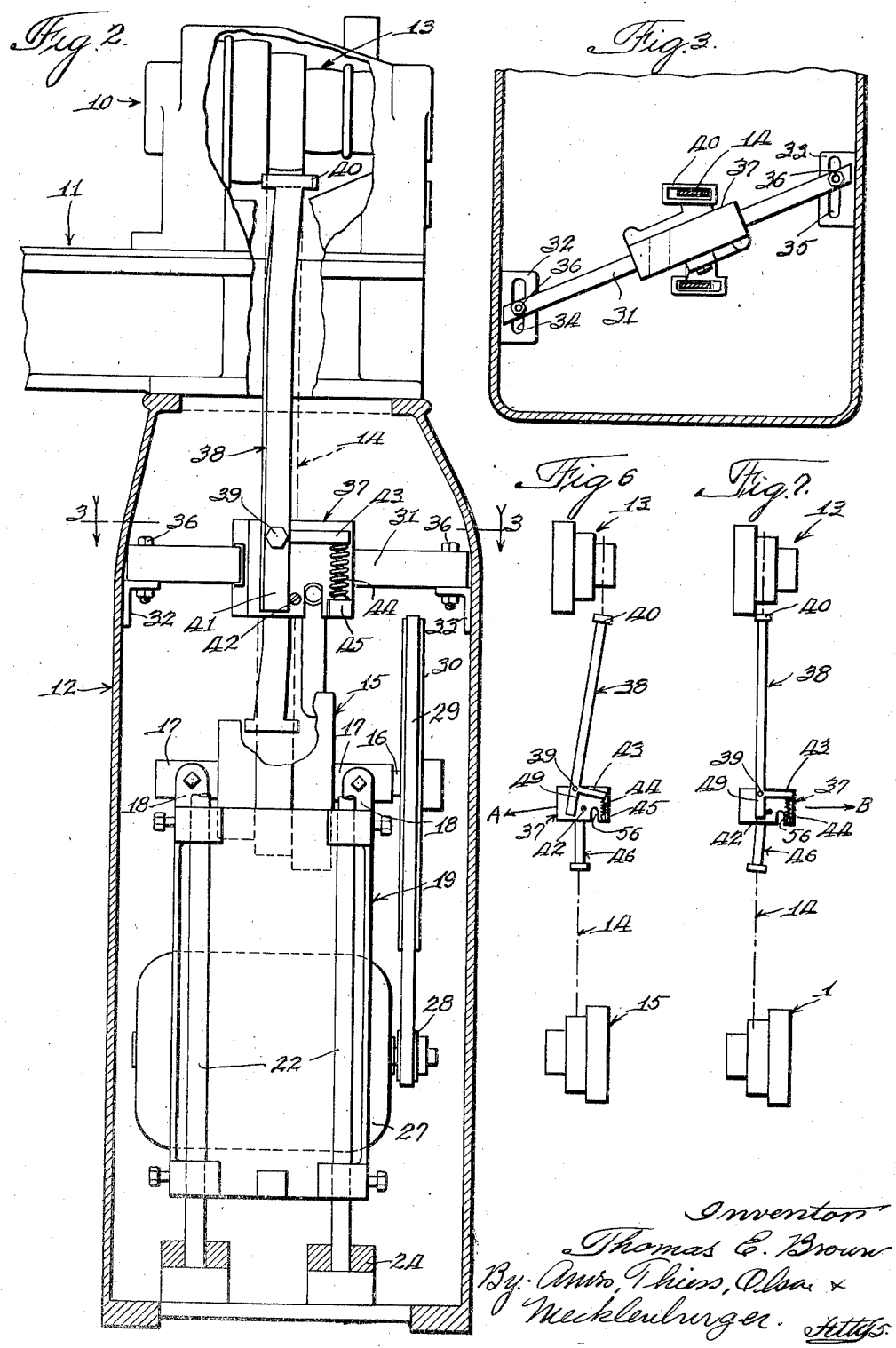
Inventor
Thomas E. Brown
By Anro, Thiess, Olson &
Mecklenburger. Attys.

Patented May 9, 1939

2,157,398

UNITED STATES PATENT OFFICE 2,157,398

BELT SHIFTING MECHANISM FOR A LATHE

Thomas E. Brown, Chicago, Ill.

Application November 15, 1937, Serial No. 174,548

4 Claims. (Cl. 74—242.4)

This invention relates to a belt shifting mechanism for a power driven machine tool and has special reference to a belt shifting mechanism for aligned reversely mounted cone pulleys of a lathe or other machine tool whereby the belt of the pulleys may be easily and quickly shifted from one step of the pulleys to another by the simple movement of a single lever.

More particularly, this invention relates to a belt shifting mechanism disposed within the housing of a machine tool comprising a substantially horizontally extending guide rod between a pair of aligned reversely mounted stepped cone pulleys and parallel with an imaginary line drawn through the corners of the steps of one of the pulleys, with a carriage slidable longitudinally of the guide rod, a pair of shifting arms being pivotally mounted on the carriage and extending in opposite directions for engaging the belt adjacent respective pulleys. Stops are provided on the carriage for engaging the shifting arms for limiting the movement thereof in one direction and means are provided for resisting movement of the shifting arms in the other direction, there being other means pivotally mounted on the outside of the housing and extending therethrough for moving the carriage into predetermined positions.

While the present belt shifting mechanism is applicable for use with various power driven machine tools, the invention has been shown in the drawings and will hereafter be described in the specification in its association with a lathe. It will be understood, therefore, that the disclosure is for illustrative purposes only.

In practically all lathes a pair of cone pulleys is employed for transmitting movement from a motor or power shaft to the lathe head so that the speed of the driven mechanism may be changed when desired, the cone pulleys being aligned and reversely mounted so that the belt engages cooperative steps of the cone pulleys which are in alignment. The pulleys are preferably enclosed in a housing for purposes of safety and ordinarily each housing has a pivotally mounted cover over the upper pulley for access to the pulley when it is desired to shift the belt. When the cover is raised and the belt shifted, there is danger of the cover accidentally falling on the fingers of the operator, and thus an automatic means for shifting the belt is very desirable when such shifting may be accomplished through means on the outside of the housing by a simple and convenient movement without the necessity of providing a pivotally mounted cover over the upper pulley.

In order to effectively shift a belt to a changed speed, it is necessary first to remove the belt from one step of one of the cone pulleys to a step of smaller diameter and thereafter throwing the belt upon the step of larger diameter on the other pulley. This is done effectively manually merely by guiding the belt with one hand onto a lower step of one pulley and then jumping the belt up to a step of greater diameter on the other pulley with a slap of the hand in the direction that the belt is traveling, while the belt is moving.

In the present construction the same effective manner of manually shifting the belt is accomplished through mechanical means in the provision of two separate shifting arms pivotally mounted on a movable carriage, one of the shifting arms extending in a direction toward one of the pulleys for engaging the belt adjacent thereto and the other shifting arm extending in an opposite direction from the carriage to engage the belt adjacent the other of the pulleys, there being a stop on the carriage for limiting the movement of one of the arms in one direction and resilient means for resisting movement of the other of the shifting arms while moving in that direction.

With one of the shifting arms held rigid, the belt adjacent one of the pulleys is guided off of a step of greater diameter onto a step of smaller diameter while the resilient means permits the belt adjacent the other pulley to remain on the initial step until the shifting of the belt on the other pulley has been accomplished, whereafter the resilient means in effect slaps the belt to effect a jumping thereof onto the step of greater diameter on the opposite pulley. A reverse order is had in reducing the speed, the rigid arm becoming the arm which is resisted by spring means and the resiliently held arm becoming the rigid arm.

One of the objects of this invention is to provide a belt shifting mechanism of the type above described whereby the belt may be easily and quickly shifted upon both pulleys by a simple movement of a single lever disposed on the outside of the housing.

Another object of this invention is to provide a belt shifting mechanism of the above noted type which is inexpensive in construction, simple and convenient in operation, and is durable.

Other objects and advantages of this invention will hereinafter be more particularly pointed out and for a more complete understanding of the characteristic features of this invention, reference may now be had to the following description when taken together with the accompanying drawings, in which latter:

Figure 1 is an end elevational view of the belt shifting mechanism embodying the features of this invention with the housing of the lathe thereof shown in section;

Fig. 2 is a rear elevational view of the shifting mechanism shown in Fig. 1 with a portion of the housing in section and another portion of the housing broken away;

Fig. 3 is a plan sectional view taken on the line 3—3 of Fig. 2 showing a portion of the shifting mechanism in elevation.

Fig. 4 is a fragmentary side elevational view of the housing showing the operating arm for the belt shifting mechanism in position;

Fig. 5 is a perspective view of the belt shifting mechanism;

Fig. 6 is a diagrammatic view illustrating the operation of the belt shifting mechanism in one direction; and Fig. 7 is a view similar to Fig. 6 showing the operation of the belt shifting mechanism when operated in an opposite direction.

Referring now more particularly to the drawings, the head stock 10 of the lathe is shown as being mounted on a bed 11 which latter is supported on the standard 12. The head stock, bed, and standard form a housing for enclosing the belt shifting mechanism of the present invention together with its associated parts which will now be described.

A stepped cone pulley 13 is rotatably mounted on the head stock 10 in any usual manner and is driven by the belt 14 from another stepped cone pulley 15, the latter being mounted on a shaft 16 suitably supported in bearings 17 which latter are set in pairs of brackets 18 extending from a base 19. The base 19 is in turn supported in an adjustable relation with the standard 12 of the housing, there being apertured ears 20 and 21 extending from one side thereof for receiving shafts 22 secured to spaced brackets 23 and 24 extending and supported by the side walls of the standard.

The base 19 is slidable in a vertical direction of the standard on the shafts 22 and after adjustment into a desired position are locked in that adjusted relation by means of bolts 25, there being a set screw 26 extending from the lower bracket 24 upwardly to engage the bottom of the vertical extension of the base 19 to augment this adjustability. A motor 27 or other power means is preferably mounted in adjustable relation with the extension of the base 19, the motor or power shaft having a pulley 28 for engaging an endless belt 29 driving a pulley 30 mounted on and fixed to the shaft 16.

The driven pulley 30 is rotated through the belt 14 by the driving pulley 15 which, in turn, is driven through the pulley 30 and its belt 29 by the motor pulley 28. Tension on the belt 14 may readily be obtained through an adjustment of the base 19 with respect to the support on which it is mounted and likewise tension on the belt 29 may be regulated by an adjustment of the position of the motor 27 on its supporting member extending from the base 19.

The pulleys 13 and 15 are aligned in a reverse direction, that is, the step of largest diameter on one of the pulleys is aligned with the step of smallest diameter on the other of the pulleys with the steps in between reversely aligned so that when the belt is shifted to another set of aligned steps, a change in speed of the driven pulley will result. In the present example illustrated in the drawings, but three steps are shown in the pulley although it is to be understood, of course, that pulleys having a greater or lesser number of steps may be employed.

In order to shift the belt from one set of cooperating steps of the pulleys to another, a belt shifting mechanism is employed comprising a substantially horizontally extending guide rod 31 disposed at an angle to the axes of the pulleys 13 and 15 and mounted on brackets 32 and 33 secured to opposite sides of the housing formed by the standard 12. The brackets 32 and 33 are provided with slots 34 and 35 respectively for receiving bolts 36 extending through the guide rod 31. The guide rod 31 is preferably of polygonal cross section and in the instance of the drawings is shown as being rectangular. The slots 34 and 35 permit the guide rod to be adjustably mounted so that the rod may be adjusted laterally into a parallel relation with an imaginary line drawn through the corners of the steps of one of the pulleys.

A carriage 37 having a polygonal seat is mounted on the polygonally shaped guide rod 31 for slidable movement longitudinally thereof. A shifting arm 38 is pivotally secured as at 39 to the carriage 37, one end of the shifting arm 38 extending to a point adjacent the pulley 13 and being provided with a loop 40 for receiving therein the belt 14. The loop 40 is preferably rectangular in shape and is of a size suitable to receive somewhat loosely therein the belt 14 when the belt is of rectangular shape although, of course, the loop may be made of any configuration conforming to the cross section of the belt.

The other end of the shifting arm 38 on the other side of the pivotal point 39 forms a forked extension, one of the forks 41 engaging a stop 42 in a normal position thereof while the other fork 43 urges the arm into such normal position by means of a compression spring 44 bearing thereagainst and against an ear 45 extending from the carriage 37. The shifting arm 38 is therefore limited in its movement in one direction by the stop 42 while the compression spring 44 resists movement of the shifting arm 38 in the other direction.

A second shifting arm 46 has one end thereof extending in an opposite direction from the carriage 37 and is pivotally secured thereto as at 47, a loop 48 receiving the belt 14 adjacent the pulley 15. The loop in this instance is the same in size and shape as the loop 40 and answers to the same description. The other end of the shifting arm 46 on the other side of the pivotal point 47 forms a forked extension, one of the forks 49 engaging a stop 52 in a normal position thereof while the other fork 49a urges the arm into such normal position by means of a compression spring 50 bearing thereagainst and against an ear 51 extending from the carriage 37. The shifting arm 46 is therefore limited in its movement in one direction by the stop 52 while the compression spring 50 resists movement of the shifting arm 46 in the other direction.

When the carriage 37 is moved longitudinally on the guide rod 31 in the direction of the arrow A as shown more particularly in Figure 5, the shifting rod 46 is held in a position fixed against movement in the opposite direction while the shifting arm 38 is resiliently held against movement in the latter direction. When the carriage 37 is moved in the direction of the arrow B the shifting arm 46 is resiliently held against movement in the opposite direction while the shifting arm 38 is rigidly held against movement in the latter direction.

Referring now more particularly to Figs. 6 and 7 of the drawings, the operation of the belt shifting mechanism is more particularly shown. In Fig. 6 a movement to decrease the speed of the driven pulley 13 is shown, the belt engaging the step of smallest diameter on the pulley 13 and the step of largest diameter on pulley 15. The carriage 37 is moved in the direction of the arrow A and the belt is about to be guided off of the step of largest diameter of pulley 15 by the shifting arm 46 which is limited in its movement and, in effect, held rigid by the stop 52. The shifting arm 38, however, is pivoted at the pivotal point 39 against the compression spring 44 whereafter as the belt 14 leaves the step of largest diameter on the pulley 15 the slack in the belt permits the compression spring 44 to urge the shifting arm 38 into its normal position with a snap movement that, in effect, jumps the belt 14 onto the step of greatest diameter of the pulley 13.

In Fig. 7, the reverse order is had where it is desired to increase the speed of the driven pulley 13 by movement of the carriage 37 in the direction of the arrow B. In this event the shifting arm 38 is held rigidly against movement in the direction opposite to the direction of movement of the carriage so that the belt is directed off of the step of greatest diameter to the step of smallest diameter on the pulley 13, the shifting arm 46 being resiliently held and being permitted to pivot until slack is obtained in the belt 14 whereafter the compression spring 50 will urge the shifting arm 46 to a normal position which, in effect, will slap the belt and jump the same onto the step of greatest diameter on the pulley 15.

The effect of the mechanical movement is substantially the same as that manually employed by operators of lathes today. However, the movement of both shifting arms is almost simultaneous, one following automatically upon the completion of movement of the other.

In order to predetermine the movement of the shifting of the belt from one step to another, a crank 53 is pivotally mounted in a bearing 54 secured to the housing formed by the standard 12, the crank having an extension 55 engaging a slot 56 in the carriage 37. The slot is preferably arranged in a vertical direction to accommodate the arcuate movement of the crank 53. The crank 53 extends through the bearing 54 and through the housing and is provided with an operating arm 57 on the outside of the housing.

Referring now more particularly to Fig. 4, the operating arm 57 is set in a substantially perpendicular position allowing for movement on each side thereof since the belt 14 is shown as being disposed on the middle step of the cooperating pulleys 13 and 15. A handle 58 is disposed on the end of the operating arm 57 and is preferably spring pressed having a plunger 59 extending therefrom to be received in apertures 60 on the outside of the housing. A movement of the handle 58 in a direction outwardly from the housing 12 retracts the plunger 59 from the apertures 60 to permit a pivotal movement of the operating arm 57.

When it is desired to shift the belt from sets of cooperative steps of the respective pulleys to adjacent steps thereof, the handle 58 is pulled outwardly to disengage the plunger 59 from the aperture 60 and the operating arm 57 is moved in the desired direction such that the plunger registers with one of the apertures 60. This movement pivots the crank 53 and therewith the extension 55 to cause a movement of the carriage in that direction. This predetermined movement of the carriage effects a shifting of the belt 14 onto the desired step in the manner as explained with reference to Figs. 6 and 7.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. A belt shifting mechanism comprising a substantially horizontally extending guide rod disposed between a pair of aligned reversely mounted stepped cone pulleys at an angle to the axes thereof and parallel with an imaginary line drawn through the corners of the steps of one of said pulleys, a carriage slidable longitudinally of said guide rod, a shifting arm pivotally mounted on said carriage and extending in one direction with the end thereof engaging one run of the belt adjacent one of said pulleys, a second shifting arm pivotally mounted on said carriage and extending in the opposite direction with the end thereof engaging the other run of the belt adjacent the other of said pulleys, a forked extension on each of the other ends of said shifting arms on the other sides of the pivotal points thereof, stops on said carriage for engaging one of the forks of each of said shifting arms for limiting the movement thereof in one direction, a compression spring between each of the other forks of said shifting arms and ears extending from said carriage for resisting movement of said shifting arms in the other direction, and means for operating said carriage into its positions of longitudinal movement.

2. A belt shifting mechanism comprising a substantially horizontally extending guide rod disposed between a pair of aligned reversely mounted stepped cone pulleys at an angle to the axes thereof and adjustable laterally into parallel relation with an imaginary line drawn through the corners of the steps of one of said pulleys, a carriage comprising a substantially rectangularly shaped block slidable longitudinally of said guide rod, a shifting arm pivotally mounted directly on one side of said block and extending in one direction with the end thereof engaging one run of the belt adjacent one of said pulleys, a second shifting arm pivotally mounted directly on the other side of said block and extending in the opposite direction with the end thereof engaging the other run of the belt adjacent the other of said pulleys, a forked extension on each of the other ends of said shifting arms on the other sides of the pivotal points thereof, stops on said carriage for engaging one of the forks of each of said shifting arms for limiting the movement thereof in one direction, and a compression spring between each of the other forks of said shifting arms and ears extending from said carriage for resisting movement of said shifting arms in the other direction.

3. In a power driven machine tool including a housing, a belt shifting mechanism therein comprising a substantially horizontally extending guide rod disposed between a pair of aligned stepped cone pulleys reversely mounted in said housing, said guide rod being positioned at an angle to the axes of said pulleys and parallel with an imaginary line drawn through the corners of the steps of one of said pulleys, a carriage slidable longitudinally of said guide rod, a shifting arm pivotally mounted on said carriage and extending in one direction with the end thereof engaging one run of a belt adjacent one of said pulleys, a second shifting arm pivotally mounted on said carriage and extending in the opposite direction with the end thereof engaging the other run of the belt adjacent the other of said pulleys, a forked extension on each of the other ends of said shifting arms on the other sides of the pivotal points thereof, stops on said carriage for engaging one of the forks of each of said shifting arms for limiting the movement thereof in one direction, a compression spring between each of the other forks of said shifting arms and ears extending from said carriage for resisting movement of said shifting arms in the other direction, and means pivotally mounted on the outside of said housing and extending therethrough for moving said carriage into predetermined positions.

4. In a power driven machine tool including a housing, a belt shifting mechanism therein comprising a substantially horizontally extending guide rod disposed between a pair of aligned stepped cone pulleys reversely mounted in said housing, said guide rod being positioned at an angle to the axes of said pulleys and parallel with an imaginary line drawn through the corners of the steps of one of said pulleys, a slotted carriage slidable longitudinally of said guide rod, a shifting arm pivotally mounted on said carriage and extending in one direction with the end thereof engaging one run of the belt adjacent one of said pulleys, a second shifting arm pivotally mounted on said carriage and extending in the opposite direction with the end thereof engaging the other run of the belt adjacent the other of said pulleys, a forked extension on each of the other ends of said shifting arms on the other sides of the pivotal points thereof, stops on said carriage for engaging one of the forks of each of said shifting arms for limiting the movement thereof in one direction, a compression spring between each of the other forks of said shifting arms and ears extending from said carriage for resisting movement of said shifting arms in the other direction, a crank pivotally mounted in said housing having an extension on the free end thereof for engaging the slot of said carriage, and an operating handle on the outside of said housing for pivoting said crank and thereby moving said carriage into predetermined positions.

THOMAS E. BROWN.